US009985836B2

(12) United States Patent
Finkelstein et al.

(10) Patent No.: US 9,985,836 B2
(45) Date of Patent: May 29, 2018

(54) DETERMINING A NETWORK TAXONOMY USING NETWORK TRANSMISSION DATA

(71) Applicant: Cox Communications, Inc., Atlanta, GA (US)

(72) Inventors: Jeff Finkelstein, Atlanta, GA (US); John Civiletto, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 86 days.

(21) Appl. No.: 14/734,874

(22) Filed: Jun. 9, 2015

(65) Prior Publication Data
US 2016/0366022 A1    Dec. 15, 2016

(51) Int. Cl.
| H04L 1/00 | (2006.01) |
| H04L 12/24 | (2006.01) |
| H04L 12/26 | (2006.01) |
| H04L 12/28 | (2006.01) |

(52) U.S. Cl.
CPC .......... *H04L 41/12* (2013.01); *H04L 12/2801* (2013.01); *H04L 43/0864* (2013.01); *H04L 43/106* (2013.01)

(58) Field of Classification Search
CPC ......... H04L 41/12; H04L 43/00; H04L 43/04; H04W 24/08
USPC ....................................................... 370/253
See application file for complete search history.

(56) References Cited

U.S. PATENT DOCUMENTS

| 7,019,637 B1* | 3/2006 | Johnson ................ G08B 21/12 340/506 |
| 2010/0185577 A1* | 7/2010 | Tsaparas .............. G06N 99/005 706/52 |
| 2013/0159348 A1* | 6/2013 | Mills ................ G06F 17/30731 707/777 |

* cited by examiner

*Primary Examiner* — Chi H Pham
*Assistant Examiner* — Alexander O Boakye
(74) *Attorney, Agent, or Firm* — Eversheds Sutherland (US) LLP

(57) ABSTRACT

A network taxonomy indicating relative locations of network access device within an access network is determined using timing data, performance data such as equalization coefficient data, and/or various other types of data. The timing data may indicate a travel time for a pair of network messages (e.g., network packets) between two network nodes such as two network access devices within the access network. A distance between the two network nodes may then be determined using this time of travel and a propagation velocity of signals transmitted through a transmission media via which the network nodes are connected.

20 Claims, 7 Drawing Sheets

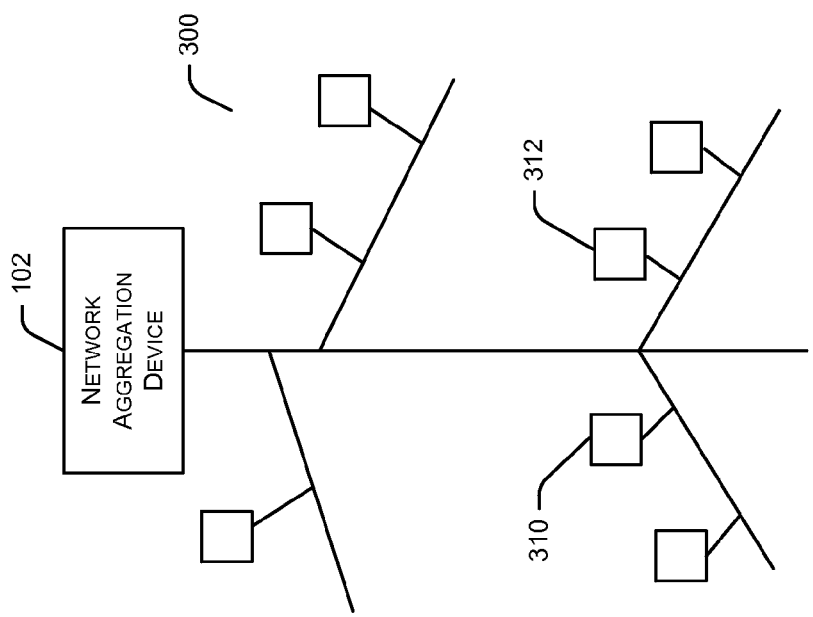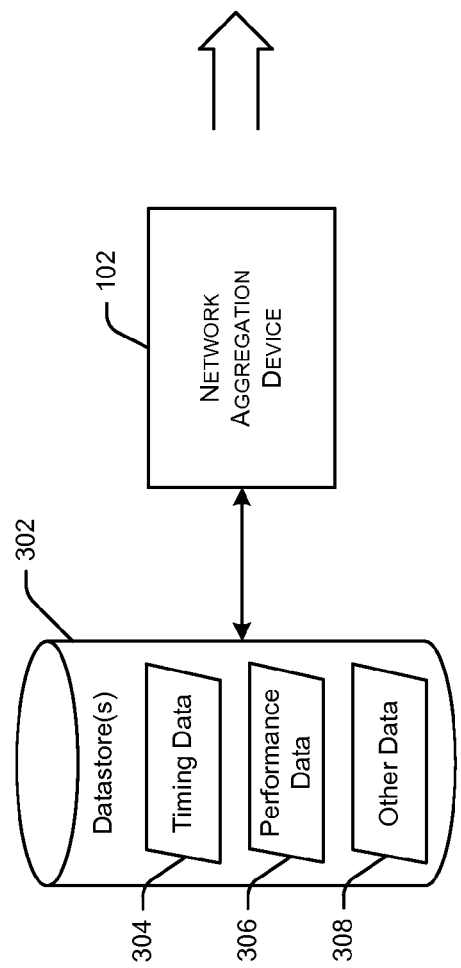
FIG. 3

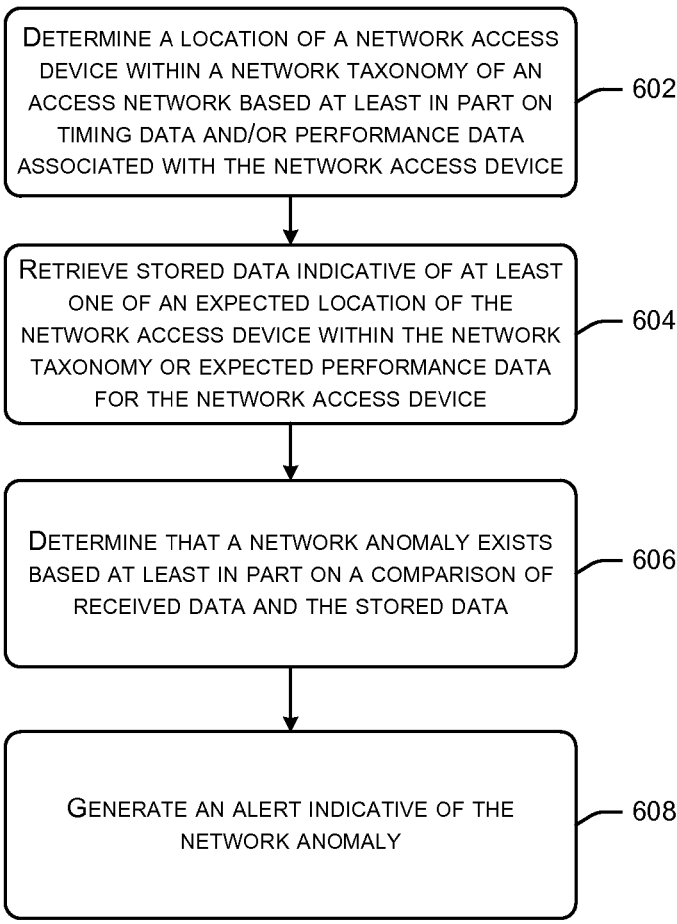

```
┌─────────────────────────────────────┐
│ DETERMINE A LOCATION OF A NETWORK ACCESS │
│ DEVICE WITHIN A NETWORK TAXONOMY OF AN │─ 602
│ ACCESS NETWORK BASED AT LEAST IN PART ON │
│ TIMING DATA AND/OR PERFORMANCE DATA │
│ ASSOCIATED WITH THE NETWORK ACCESS DEVICE │
└─────────────────────────────────────┘
                  ↓
┌─────────────────────────────────────┐
│ RETRIEVE STORED DATA INDICATIVE OF AT LEAST │
│ ONE OF AN EXPECTED LOCATION OF THE │
│ NETWORK ACCESS DEVICE WITHIN THE NETWORK │─ 604
│ TAXONOMY OR EXPECTED PERFORMANCE DATA │
│ FOR THE NETWORK ACCESS DEVICE │
└─────────────────────────────────────┘
                  ↓
┌─────────────────────────────────────┐
│ DETERMINE THAT A NETWORK ANOMALY EXISTS │
│ BASED AT LEAST IN PART ON A COMPARISON OF │─ 606
│ RECEIVED DATA AND THE STORED DATA │
└─────────────────────────────────────┘
                  ↓
┌─────────────────────────────────────┐
│ GENERATE AN ALERT INDICATIVE OF THE │─ 608
│ NETWORK ANOMALY │
└─────────────────────────────────────┘
```

FIG. 6

DETERMINING A NETWORK TAXONOMY USING NETWORK TRANSMISSION DATA

BACKGROUND

A variety of types of access networks exist for providing users with high speed data services, television services, telephony services, and the like. Examples of such access networks include, for example, a cable access network that may utilize a hybrid fiber-coax infrastructure that supports both upstream and downstream data transmission between a head-end location where incoming signals are received and customer premises equipment; an optical access network such as a passive optical network (PON), an active optical network (AON), or the like in which optical fiber provides all or part of the local loop used for last mile communications; a wireless-based access network such as a satellite-based access network that relays network data between ground stations and transceivers located at a subscriber's premises via geosynchronous satellites or a wireless cellular network that includes a network of distributed cells, with each cell served by an access point (e.g., a base station) that enables portable transceivers (e.g., mobile devices) to communicate with the base station and with each other via the base station; a Digital Subscriber Line (DSL) access network in which network access is provided by transmitting digital data over the wires of a local telephone network (e.g., a public switched telephone network (PSTN); and so forth.

Data transmitted across an access network may be packaged and transmitted in accordance with one or more protocols corresponding to the access network. For example, in cable access networks, a version of the Data Over Cable Service Interface Specification (DOCSIS) may include various protocols at various layers of the Open Systems Interconnection (OSI) model of communication (e.g., Media Access Control (MAC) layer protocols) that specify how network data is to be packaged and transmitted in order to enable high-bandwidth data transfer on an existing cable television architecture.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 3 is a schematic diagram illustrating the use of timing data, performance data, and/or other types of data to determine an illustrative network taxonomy in accordance with one or more example embodiments of the disclosure.

FIG. 6 is a process flow diagram of an illustrative method for identifying a network anomaly using a network taxonomy in accordance with one or more example embodiments of the disclosure.

DETAILED DESCRIPTION

Overview

Figure 1:
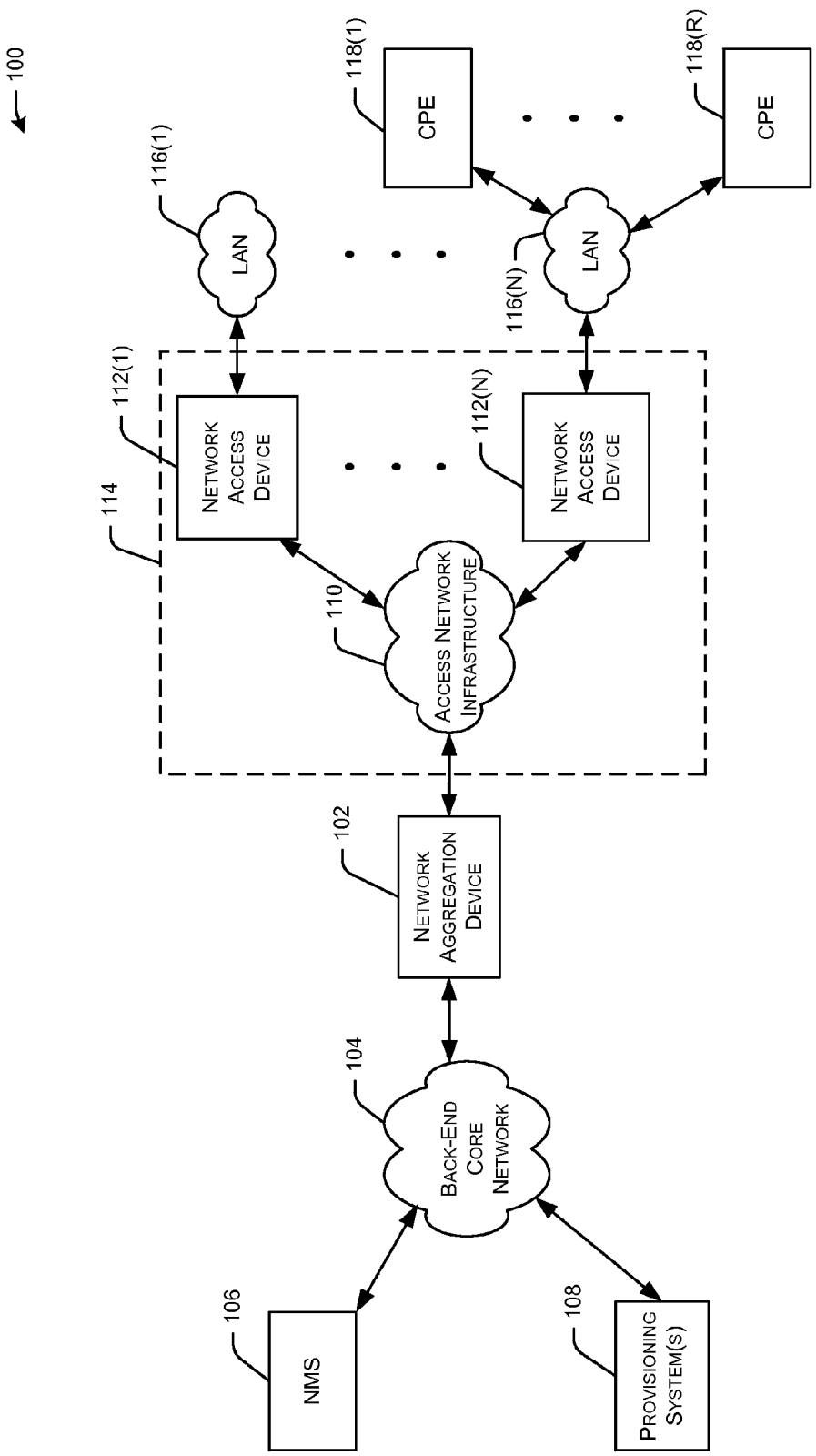
FIG. 1 is a schematic block diagram of an illustrative system architecture in accordance with one or more example embodiments of the disclosure.

This disclosure relates to, among other things, systems, methods, computer-readable media, techniques, and methodologies for determining a network taxonomy using timing data, performance data such as equalization coefficient data, and/or various other types of data. In certain example embodiments, the timing data may indicate a travel time for network transmissions (e.g., network packets) between two network nodes. A distance between the two network nodes may then be determined using this time of travel and a propagation velocity of signals transmitted through a transmission media via which the network nodes are connected. This determined distance may be used, at least in part, to determine a network taxonomy for an access network that includes the network nodes.

In certain example embodiments, a distance of a network node (e.g., a network access device such as a cable modem, a DSL modem, an optical network terminal (ONT), a gateway device, a set-top box, or the like) from a network aggregation device (e.g., a Cable Modem Termination System (CMTS), a Digital Subscriber Line Access Multiplexer (DSLAM), a wireless access point (WAP), or the like) may be determined. For example, a network aggregation device may transmit a message to a network access device that includes a timestamp indicative of a time of transmission of the message. The network access device may receive the message and transmit a response that includes a timestamp indicative of a time of receipt of the message. Upon receipt of the response, the network aggregation device may utilize the timestamps to determine the round-trip time between transmission of the message and receipt of the response, and may further determine the distance of the network access device from the network aggregation device using the round-trip time and the propagation velocity of signals transmitted across the type of the access network that connects the network aggregation device and the network access device.

The signal propagation velocity may vary based on the transmission media used in the access network architecture. For example, an optical network (e.g., a PON, an AON, etc.) may include optical fiber as the transmission medium between the network aggregation device and an endpoint located in proximity to the network access device. The distance from the endpoint and the network access device may vary based on what portion of the local loop used for last mile communications includes optical fiber. Fiber to the X (FTTX) is a generic term for any broadband network architecture that uses optical fiber to provide all or part of the local loop. FTTX may include fiber-to-the-node (FTTN); fiber-to-the-curb (FTTC); fiber-to-the-premises (FTTP) such as fiber-to-the-building (FTTB) or fiber-to-the-home (FTTH); or any of a variety of other configurations. The signal propagation velocity may be greater for those optical network configurations that utilize optical fiber for more of the local loop. Similarly, the signal propagation velocity may be greater for an optical network architecture as compared to a hybrid-fiber-coax (HFC) network architecture in which coaxial cable makes up a greater portion of the transmission media of the access network.

In certain example embodiments, a network taxonomy for an access network may be determined based at least in part on timing data included in network transmissions between a network aggregation device and a network access device. For example, a network aggregation device (e.g., a CMTS, a DSLAM, a WAP, etc.) may utilize timing data included in network transmissions to determine the locations of network access devices within an access network. The timing data may include, for example, a time associated with transmission of a network message and/or a time associated with receipt of a network message. The network aggregation device may determine the distance to a network access device by determining a round-trip time of travel of network communications between the network aggregation device and the network access device and a propagation velocity of signals along the transmission media of the access network.

The round-trip time of travel may be determined as a sum of: i) the difference between a first timestamp indicating a time of transmission of a first message from the network aggregation device to the network access device and a second timestamp indicating a time of receipt of the first message by the network access device (or a time of transmission of a second message (e.g., a response message to the first message)) and ii) the difference between the second timestamp and a time of receipt of the response message by the network aggregation device. The first timestamp may be included in a header of the first message and the second timestamp may be included in a header of the response message. In other example embodiments, in lieu of, or in addition to timestamps, the timing data may specify travel times between the network aggregation device and the network access device, between the network access device and another network access device along the transmission path, and so forth.

The network aggregation device may utilize timing data to determine round-trip travel times for network transmissions between the network aggregation device and any number of network access devices of an access network. The network aggregation device may further determine respective distances of the network access devices from the network aggregation device based on the determined travel times and a propagation velocity of signals along the transmission media of the access network. Upon determining the distances of network access devices from the network aggregation device, a network taxonomy may be determined for the access network. The network taxonomy may indicate a location of each network access device within the access network in relation to the network aggregation device.

In certain example embodiments, other types of data may be used to further refine the network taxonomy for the access network. More specifically, in certain example embodiments, timing data alone may not be sufficient to determine the location of a network access device in relation to the network aggregation device and in relation to other network access devices within the access network. In such example embodiments, network performance data may be used in conjunction with timing data to determine the network taxonomy. Performance data may include, for example, equalization coefficients, linear distortion data, or any other suitable data that may be used to ascertain the relative locations of two or more network access devices with respect to each other and with respect to the network aggregation device within the access network. It should be appreciated that a location of a network access device within an access network may be interchangeably described herein as a location of the network access device within a network taxonomy for the access network.

For example, based on timing data, the network aggregation device may determine that network access device A and network access device B are equidistant from the network aggregation device. However, the timing data may not be sufficient to determine the specific location of each network access device within the network taxonomy. For example, network access device A and network access device B may be connected to a same TAP or to different TAPs that are each equidistant from the network aggregation device. In such an example, the network aggregation device may further utilize performance data to ascertain the locations of the network access devices within the network taxonomy. For example, if network transmissions received from network access device A and network access device B indicate similar equalization coefficients, linear distortions, or the like, then the network aggregation device may determine that network access device A and network access device B share substantially the same transmission path, and thus, are connected to the same TAP. Equalization coefficients, linear distortions, or the like of network transmissions from network access device A may be determined to be similar to equalization coefficients, linear distortions, or the like of network transmissions from network access device B if they are within a threshold value of one another. On the other hand, if the performance attributes of network transmissions received from network access device A and network access device B differ substantially (e.g., by more than a threshold value), the network aggregation device may determine that the network access devices are located on different legs or segments of the network taxonomy (e.g., connected to different TAPs). Equalization coefficients, linear distortions, or the like may be referred to herein as network performance parameters.

In certain example embodiments, performance data alone may be used to determine the location of a network access device within an access network. For example, a location of network access device A may be determined using timing data, and optionally, performance data for network access device A. A location of network access device B may then be determined based on a comparison of performance data for network access device B to performance data for network access device A. For example, if equalization coefficients of network transmissions from network access device B match equalization coefficients of network transmissions from network access device A (within a threshold tolerance), it may be determined that network access device B is located proximate to network access device A (e.g., connected to the same TAP) within the access network. Thus, in certain example embodiments, the location of network access device B within the access network may be determined without using timing data associated with network transmissions from network access device B.

In certain example embodiments, a network taxonomy may be used to identify a network anomaly. For example, a determined location of a network access device within an access network (as specified by a network taxonomy for the access network) may be compared to stored data indicating a service address associated with the network access device. If the location of the network access device within the network taxonomy indicates that the device is not located at the associated service address, this may indicate a possibility of theft or misuse of the device. An alert may be generated to indicate the possibility of device theft or misuse. Similarly, if performance data associated with network transmissions received from the network access device differs substantially from performance data previously received, this may also indicate a possibility of theft or misuse of the device. In other example embodiments, deviations between the determined location of a network access device within an access network and stored data indicative of a service address associated with the network access device may occur for reasons other than theft of the device. For example, a user may legitimately obtain a network access device registered at a particular service address but may attempt to locate the device at a different physical location than the service address. In such a scenario, the location of the device within the network taxonomy may differ from the registered service address. As another example, a user may attempt to connect an unauthorized device to the access network. In such a scenario, no stored data may exist indicating a registered service address for the device even though a location of the device within the access network is determined.

In other example embodiments, the timing data, performance data, and/or network taxonomy generally may be evaluated to identify network impairment issues. For example, aberrant performance data may indicate malfunction of a particular network access device if performance data for other network access devices located proximate to the particular network access device in the network taxonomy do not exhibit similar aberrant performance data. As yet another example, aberrant performance data associated with a group of network access devices that are located similar distances from the network aggregation device may indicate a network issue with another network component (e.g., a TAP to which the group of network access devices are connected).

Example embodiments of the disclosure provide a number of technical features or technical effects. For example, in accordance with example embodiments of the disclosure, a network taxonomy may be determined for an access network based on data (e.g., timing data, performance data, etc.) included in network transmissions between devices of the access network. The network taxonomy may indicate a location of a network access device within an access network with respect to a network aggregation device and with respect to other network access devices in the access network. The network taxonomy may be used to identify network impairments, possible theft or misuse of a network access device, or the like. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Architectures

FIG. 1 is a schematic block diagram of an illustrative network architecture 100 in accordance with one or more example embodiments of the disclosure. The illustrative network architecture 100 may include a network aggregation device 102 that communicatively couples a back-end core network 104 with an infrastructure 110 of an access network 114. The back-end core network 104 may, in turn, be communicatively coupled to one or more provisioning systems 108 and a network management system 106. The access network 114 may correspond to any of a variety of types of access networks. For example, the access network 114 may be a coaxial-based broadband access network (e.g., a cable access network) that may include an HFC infrastructure or an all-coaxial infrastructure. In other example embodiments, the access network 114 may an optical distribution network such as a PON, AON, or the like. In still other example embodiments, the access network 114 may be a wireless access network such as a wireless cellular network, a wireless wide area network (WAN), a wireless local area network (LAN), a satellite-based network, or the like. In yet other example embodiments, the access network 114 may be a public switched telephone network (PSTN) that provides DSL access to customer premises equipment. It should be appreciated that the above examples of access networks are merely illustrative and not exhaustive.

If the access network 114 is a cable access network, the network aggregation device 102 may be a CMTS. The CMTS may be located at a head end or hub location. The infrastructure 110 of the cable access network may be an all-coaxial infrastructure that includes only co-axial cable for the transmission media between the CMTS and one or more network access devices 112(1)-112(N) (generically referred to herein as network access device 112) or an HFC infrastructure that includes a network of optical fiber nodes that receive downstream optically modulated signals from the CMTS via one or more optical fiber links and convert the optical signals to electrical signals (e.g., radio frequency (RF) modulated signals) for ultimate transmission to the network access device(s) 112(1)-112(N). An optical fiber node may also include a reverse/return path transmitter for transmitting upstream communications from the network access device(s) 112(1)-112(N).

In a typical HFC infrastructure, coaxial cable may be the physical medium along which data is transmitted between an optical node of the access network 114 and a network access device 112. The coaxial portion of the HFC infrastructure may connect between 25 and 2000 homes to a single optical fiber node in a tree-and-branch configuration. One or more amplifiers (e.g., RF amplifiers) (not shown) may be provided at intervals along the transmission path to overcome cable attenuation and passive losses of the electrical signals that can be caused by splitting or "tapping" the coaxial cable. For example, in the coaxial portion of the HFC architecture, a trunk coaxial cable may be connected to an optical fiber node and may form part of a coaxial backbone to which smaller distribution cables are connected. A trunk amplifier may be provided along the trunk coaxial cable. The smaller distribution cables may be connected to a port of the trunk amplifier and may carry the RF signals down, for example, individual streets. Smaller distribution amplifiers (e.g., line extenders) may be provided downstream from the trunk amplifier for boosting the signal power. A TAP may then be provided for tapping into a distribution line and connecting individual drops to customer premises. A single TAP may serve about 4 customer premises. Each network access device 112 may be associated with a corresponding customer premises.

As shown in FIG. 1, each network access device 112(1)-112(N) may be communicatively coupled to a corresponding LAN 116(1)-116(N) (generically referred to herein as LAN 116). A network access device (e.g., network access device 112(N)) may transmit and receive signals (e.g., RF signals) via a corresponding LAN (e.g., LAN 116(N)) to one or more customer premises equipment (CPE) 118(1)-118(R) (generically referred to herein as CPE 118). A network access device 112 may be, for example, a cable modem, a DSL modem, a residential gateway, a network interface device (e.g., an optical network terminal (ONU)), a set-top box (STB), or the like. A CPE 118 may include, for example, a mobile computing device (e.g., a smartphone, a tablet, a wearing computing device, etc.), a desktop computing device, a laptop computing device, a content streaming device, an STB, or the like. It should be appreciated that the above examples of network access devices 112 and CPE 118 are merely illustrative and not exhaustive. The LAN 116 may be, for example, a wireless LAN that utilizes any suitable wireless communication protocol, technology, or standard including, but not limited to, a radio frequency communication protocol such as any of the IEEE 802.11 standards (e.g., Wi-Fi™), Near Field Communication (NFC) standards, or the like; a microwave communication protocol such as Bluetooth™; and so forth.

While the access network 114 has been illustratively described above in connection with a cable access network infrastructure, the access network 114 may be any of a variety of other types of access networks. For example, the access network 114 may be a PON that may include a point-to-multipoint architecture in which optical splitters may be used to enable a single optical fiber to serve multiple customer premises. If the access network 114 is a PON, the network aggregation device 102 may be an optical line terminal (OLT) that may be provided at, for example, a service provider's central office. The OLT may be connected to a hub location that may form part of a backhaul of the PON that may include one or more intermediate links for carrying traffic between the OLT and the back-end core network 104. In certain example embodiments of the disclosure, the OLT may be provided at the hub, in which case, the hub may or may not correspond to the service provider's central office.

If, for example, the access network 114 is a PON, the access network infrastructure 110 may include an optical distribution network (ODN) that may include optical splitters and fiber optic communication links. An optical splitter may split a fiber optic signal received along a single optical fiber from the OLT into multiple signals that may be transmitted along respective fiber optic links to respective customer premises. If the access network 114 is a PON, the network access device 112 may be an ONU or an optical network terminal (ONT). The ONU or ONT may be provided at a customer premises that terminates the PON and provides native service interfaces to the customer. In certain example embodiments of the disclosure, the ONT may provide services such as telephony (e.g., plain old telephone service (POTS), voice over IP (VoIP), etc.), data services (e.g., Ethernet data), video, or telemetry. In other example embodiments of the disclosure, the ONT may implement a separate subscriber unit to implement such services. For example, the ONT may present a converged interface such as, for example, a DSL, coaxial cable, or multiservice Ethernet interface to the user, and CPE 118 (e.g., network termination equipment (NTE)) may input the converged interface and output the native service interfaces to the subscriber. While example embodiments have been described above in connection with a PON, it should be appreciated that the access network 114 may be another type of optical network such as, for example, an AON that employs a point-to-point (PTP) network structure in which dedicated fiber optic links are provided between each network access device 112 (e.g., each ONT) and an optical concentrator.

In other example embodiments, the access network 114 may be a wireless access network such as a wireless cellular network that includes a network of distributed cells. Each cell may be served by a network aggregation device 102 (e.g., a WAP) that enables portable transceivers (e.g., mobile phones) to communicate with the WAP and with each other via the WAP. The wireless cellular network may employ any of a variety of cellular communication standards including, for example, third generation (3G) communication standards (e.g., the Universal Mobile Telecommunications Systems (UMTS), the CDMA2000 standard, etc.), fourth generation (4G) communication standards (e.g., Worldwide Interoperability for Microwave Access (WiMAX), Long-Term Evolution (LTE), etc.), and so forth.

In other example embodiments of the disclosure, the access network 114 may be a wireless LAN or wireless WAN according to which two or more devices may communicate using a wireless distribution method such as spread-spectrum or orthogonal frequency division multiplexing (OFDM) radio. The wireless LAN or wireless WAN may include any number of stations, each of which may be equipped with a wireless network interface controller (WNIC). Client stations may communicate with the network aggregation device 102 (e.g., a WAP) via RF communication channels, and the WAP may provide the client stations with Internet connectivity via a wired connection to the Internet. In yet other example embodiments of the disclosure, the access network 114 may be a satellite-based access network that relays network data between a ground station gateway device (not shown) and a transceiver (not shown) located at a subscriber's premises via geosynchronous satellites. A network access device 112 (e.g., a modem) may provide an interface between the transceiver and CPE 118 at the customer premises. The network access device 112 may be configured to modulate input bit streams received from the CPE 118 and demodulate signals received from the transceiver. The network access device 112 may include coaxial connectivity to the transceiver and Ethernet connectivity to the CPE 118.

In still other example embodiments, the access network 114 may be a PSTN via which DSL Internet access may be provided to a customer premises. DSL service may deliver digital data to CPE 118 over the same telephone wires of the PSTN via which wired telephone service is delivered. In those example embodiments in which the access network 114 is a PSTN, the network aggregation device 102 may be a DSLAM provided at a local telco exchange. The DSLAM may include multiple aggregation cards, with each aggregation card having multiple ports where each port communicates with a corresponding network access device 112 (e.g., DSL modem) located at a subscriber's premises. For upstream transmission, the access network infrastructure 110 may include a telephone line (typically twisted-pair copper wire) that simultaneously carries voice and data traffic encoded at different frequencies from the subscriber premises to the DSLAM, which may be configured to separate the voice and data signals and forward the data signals to the back-end core network 104 and the voice signals to the telco's PSTN. For downstream transmission (which offers faster transmission rates than upstream traffic in an asymmetric architecture), the DSLAM may be configured to multiplex voice and data signals into a composite signal and transmit the composite signal via a telephone line to the subscriber's premises, where a splitter may be provided to split the voice and data signals and direct the voice signals to telephone equipment and the data signals to the network access device 112. In certain implementations, a residential gateway device may be provided that provides the functionality of a DSL modem, routing functionality, as well as Internet Protocol (IP) telephony functionality.

Referring now to other illustrative components of the architecture 100, the back-end core network 104 may include any one or more different types of communications networks such as, for example, public networks (e.g., the Internet), private networks (e.g., frame-relay networks), or any other suitable private or public packet-switched or circuit-switched networks. Further, the back-end core network 104 may have any suitable communication range associated therewith and may include, for example, global networks (e.g., the Internet), metropolitan area networks (MANs), WANs, or the like. In addition, the back-end core network 104 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The architecture 100 may further include one or more provisioning systems 108. If, for example, the access network 114 is a cable access network, the provisioning system (s) 108 may include a Dynamic Host Configuration Protocol (DHCP) server that may provide a network access device 112 (e.g., a cable modem) with initial configuration information such as, for example, an Internet Protocol (IP) address when the network access device 112 boots up. The provisioning system(s) 108 may further include a configuration file server from which a network access device 112 may download configuration files when booting up; a software download server from which the network access device 112 may download software upgrades; a time protocol server that may provide a network access device 112 with time of day information; a certificate revocation server that may provide certificate status to a network access device 112; and so forth.

The architecture 100 may further include a network management system (NMS) 106. If, for example, the access network 114 is a cable access network, the NMS 106 may include a simple network management protocol (SNMP) manager that may utilize SNMP to configure and monitor the operations of various network devices within the access network 114 (e.g., the CMTS, a cable modem, etc.). The NMS 106 may include any number of additional components for monitoring network devices in the access network 114 and/or collecting performance data relating to the network devices. While the provisioning system(s) 108 and the NMS 106 have been described above in relation to example embodiments in which the access network 114 is a cable access network, it should be appreciated that the provisioning system(s) 108 and NMS 106 may include similar (or different) components in other access networks.

In accordance with example embodiments of the disclosure, determining a network taxonomy for the access network 114 may include determining a location of each network access device 112 within the access network 114. Determining a location of each network access device 112 within the access network 114 may include a determining a distance of a network access device 112 from the network aggregation device 102 and a relative location of the network access device 112 in relation to one or more other network access devices of the access network 114. As previously noted, timing data and/or performance data may be used to determine a location of a network access device 112 within the access network 114. In certain example embodiments, timing data may be used to determine a distance of a network access device 112 from the network aggregation device 102, and performance data associated with the network access device 112 may be used to further determine a particular network segment of the access network 114 with which the network access device 112 is associated. A network segment may refer to a particular TAP, a particular smaller distribution cable, or a particular trunk coaxial cable. For example, network access devices 112 connected to a same TAP may form part of a same network segment of the access network 114. In certain example embodiments, in addition to determining the locations of network access devices 112 within the access network 114, the locations of other components of the access network 114 (e.g., a TAP, an amplifier, etc.) may also be determined.

Figure 2:
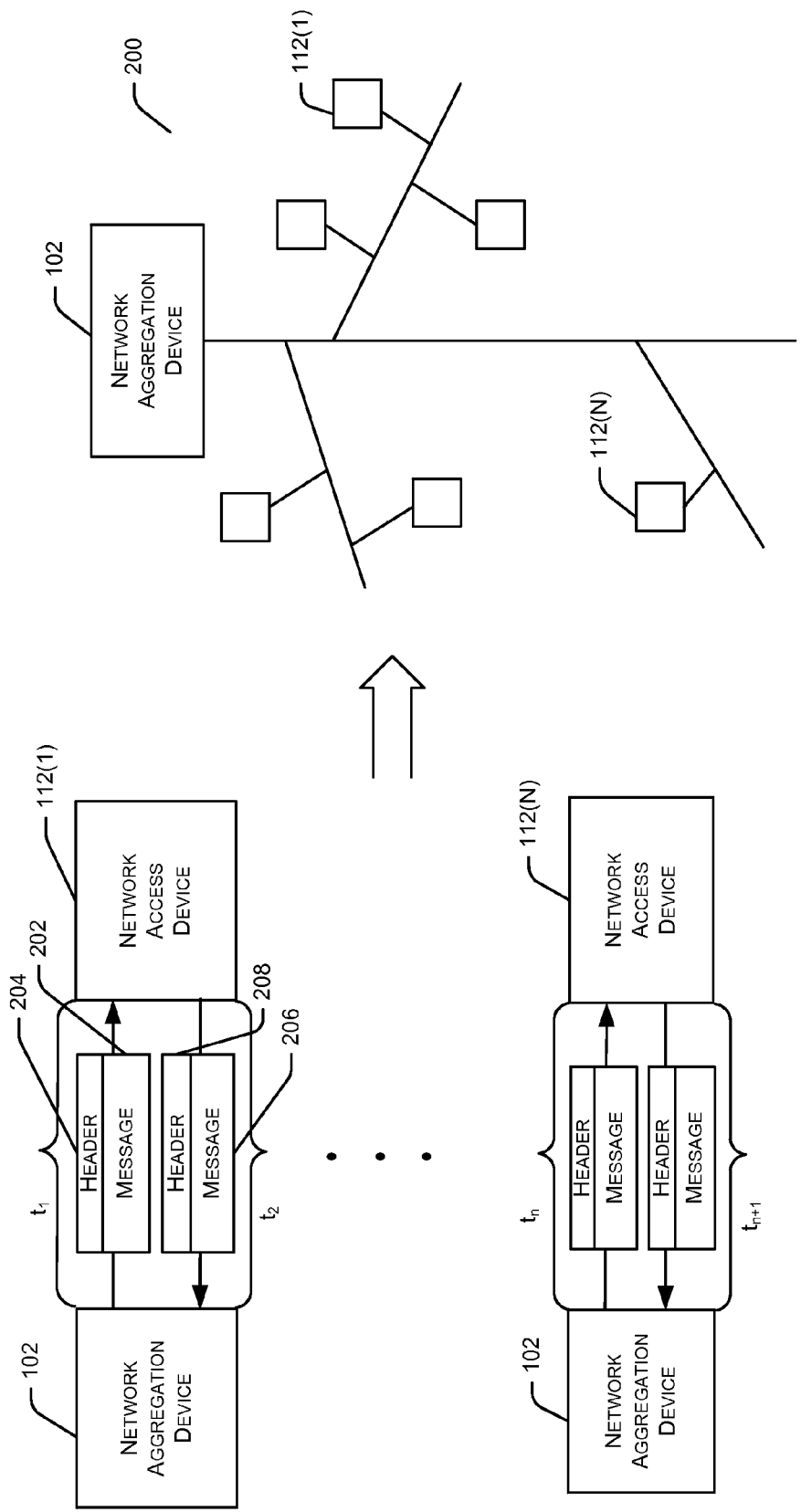
FIG. 2 is a schematic diagram illustrating the use of timing data to determine an illustrative network taxonomy in accordance with one or more example embodiments of the disclosure.

FIG. 2 is a schematic diagram illustrating the use of timing data to determine an illustrative network taxonomy 200 in accordance with one or more example embodiments of the disclosure. As previously noted, in certain example embodiments, the network taxonomy 200 for an access network 114 may be determined based at least in part on timing data included in network transmissions between the network aggregation device 102 and a network access device 112.

For example, the network aggregation device 102 may transmit a first message 202 to a network access device 112(1). The first message 202 may include a header 204 that may include timing data associated with the first message 202. More specifically, in certain example embodiments of the disclosure, the header 204 may include a first timestamp indicating a time of transmission of the first message 202. Upon receipt of the first message 202, the network access device may transmit a second message 206 (e.g., a response message) to the network aggregation device 102. The second message 206 may include a header 208 that may include timing data as well. More specifically, the header 208 may include a second timestamp indicating a time of receipt of the first message 202 by the network access device 112(1) or a time of transmission of the response message 206. In certain example embodiments, the difference between the time of receipt of the first message 202 and the time of transmission of the response message 206 may be less than a threshold period of time.

The network aggregation device 102 (or another device component of the architecture 100) may utilize the timing data included in the messages 202 and 206 to determine a round-trip time of travel between the network aggregation device 102 and the network access device 112(1). For example, the difference between the first timestamp indicating a time of transmission of the first message 202 and the second timestamp indicating a time of receipt of the first message 202 by the network access device (or a time of transmission of the second message 206) may be determined. This difference may be a time $t_1$. In addition, the difference between the second timestamp and a time of receipt of the second message 206 by the network aggregation device 102 may be determined. This difference may be time $t_2$. The times $t_1$ and $t_2$ may then be summed to determine the round-trip travel time for the messages 202, 206.

Upon determining the round-trip travel time ($t_1+t_2$), the network aggregation device 102 (or another device component of the architecture 100) may determine a distance of the network access device 112(1) from the network aggregation device 102. More specifically, a signal propagation velocity may be determined for the access network 114. The signal propagation velocity may be determined based on the type of transmission media forming part of the infrastructure 110 of the access network 114. As previously noted, the greater the proportion of optical fiber links (as compared, for example, to coaxial transmission links) in the infrastructure 110, the greater the signal propagation velocity may be. Upon determining the signal propagation velocity, the round-trip travel time ($t_1+t_2$) may be multiplied by the signal propagation velocity to determine the distance of the network access device 112(1) from the network aggregation device.

The respective distances of other network access devices 112 from the network aggregation device 102 may be determined in a similar manner. Using at least the determined distances of the network access devices 112 from the network aggregation device 102, the network taxonomy 200 may be generated for the access network 114. The network taxonomy 200 may indicate a location of each network access device 112 within the access network 114 in relation to the network aggregation device 102. It should be appreciated that the network taxonomy 200 depicted in FIG. 2 may represent only a portion of the entire network taxonomy for the access network 114. Further, while example embodiments have been described above in connection with timing data that includes timestamps indicating times of transmission or receipt of network communications, it should be appreciated that, in other example embodiments, the timing data may specify travel times in addition to, or in lieu of, timestamps. The travel times may include travel times between the network aggregation device 102 and a particular network access device 112, between the particular network access device 112 and another network access device 112 along the transmission path, and so forth.

FIG. 3 is a schematic diagram illustrating the use of timing data, performance data, and/or other types of data to determine an illustrative network taxonomy 300 in accordance with one or more example embodiments of the disclosure. It should be appreciated that the network taxonomy 300 depicted in FIG. 3 may represent only a portion of the network taxonomy for the access network 114.

As previously noted, in certain example embodiments, other types of data may be used to further refine a network taxonomy for the access network 114. More specifically, in certain example embodiments, timing data 304 alone may not be sufficient to determine the location of a network access device 112 in relation to the network aggregation device 102 and in relation to other network access devices 112 within the access network 114. In such example embodiments, network performance data 306 may be used in conjunction with timing data to determine the network taxonomy. Performance data 306 may include, for example, equalization coefficients, linear distortion data, or any other suitable data that may be used to ascertain the relative locations of two or more network access devices 112 with respect to each other and with respect to the network aggregation device 102 within the access network 114.

For example, based on the timing data 304, the network aggregation device 102 may determine that network access device 310 and network access device 312 are equidistant from the network aggregation device 102. However, the timing data 304 may not be sufficient to determine the specific location of each network access device 310, 312 within the network taxonomy 300. For example, network access device 310 and network access device 312 may be connected to a same TAP or to different TAPs that are each equidistant from the network aggregation device 102.

In such an example embodiment, the network aggregation device 102 may further utilize performance data 306 to ascertain the locations of the network access devices 310, 312 within the network taxonomy 300. For example, if network transmissions received from network access device 310 and network access device 312 indicate similar equalization coefficients, linear distortions, or the like, then the network aggregation device 102 may determine that network access device 310 and network access device 312 share substantially the same transmission path, and thus, are connected to the same TAP. Equalization coefficients, linear distortions, or the like of network transmissions from network access device 310 may be determined to be similar to equalization coefficients, linear distortions, or the like of network transmissions from network access device 312 if they are within a threshold value of one another. On the other hand, if the performance data 306 associated with network access device 310 and network access device 312 differ substantially (e.g., by more than a threshold value), the network aggregation device 102 may determine that the network access devices 310, 312 are located on different legs or segments of the network taxonomy 300 (e.g., connected to different TAPs).

The illustrative network taxonomy 300 shown in FIG. 3 indicates that network access device 310 is connected to a different network segment than network access device 312, but that each device is approximately equidistant to the network aggregation device 102. This determination may be made if the timing data 304 for the network access devices 310, 312 indicates that the devices are approximately equidistant from the network aggregation device 102, but the performance data 306 indicates that corresponding values of one or more network performance parameters for the devices 310, 312 differ by more than one or more threshold values.

In certain example embodiments, the performance data 306 alone may be used to determine the location of a network access device (e.g., network access device 312) within the access network 114. For example, a location of network access device 310 may be determined using the timing data 304, and optionally, the performance data 306 corresponding to network access device 310. A location of network access device 312 may then be determined based on a comparison of the performance data 306 for network access device 312 to the performance data 306 for network access device 310. For example, if equalization coefficients of network transmissions from network access device 312 differ from equalization coefficients of network transmissions from network access device 310 (by more than a threshold tolerance), it may be determined that network access device 312 is located on a different network segment (e.g., connected to a different TAP, distribution cable, or the like) from network access device 310 within the access network 114. This may, in turn, be reflected in the relative locations of the network devices 310, 312 within the network taxonomy 300. Further, in certain example embodiments, other data 308 (e.g., power level data, signal distortion data, etc.) may be used in addition to, or in lieu of, timing data 304 and/or performance data 306 to determine a network taxonomy for the access network 114. The timing data 302, performance data 304, and/or other data 308 may be stored in one or more datastores 302 accessible by the network aggregation device 102.

Figure 4:
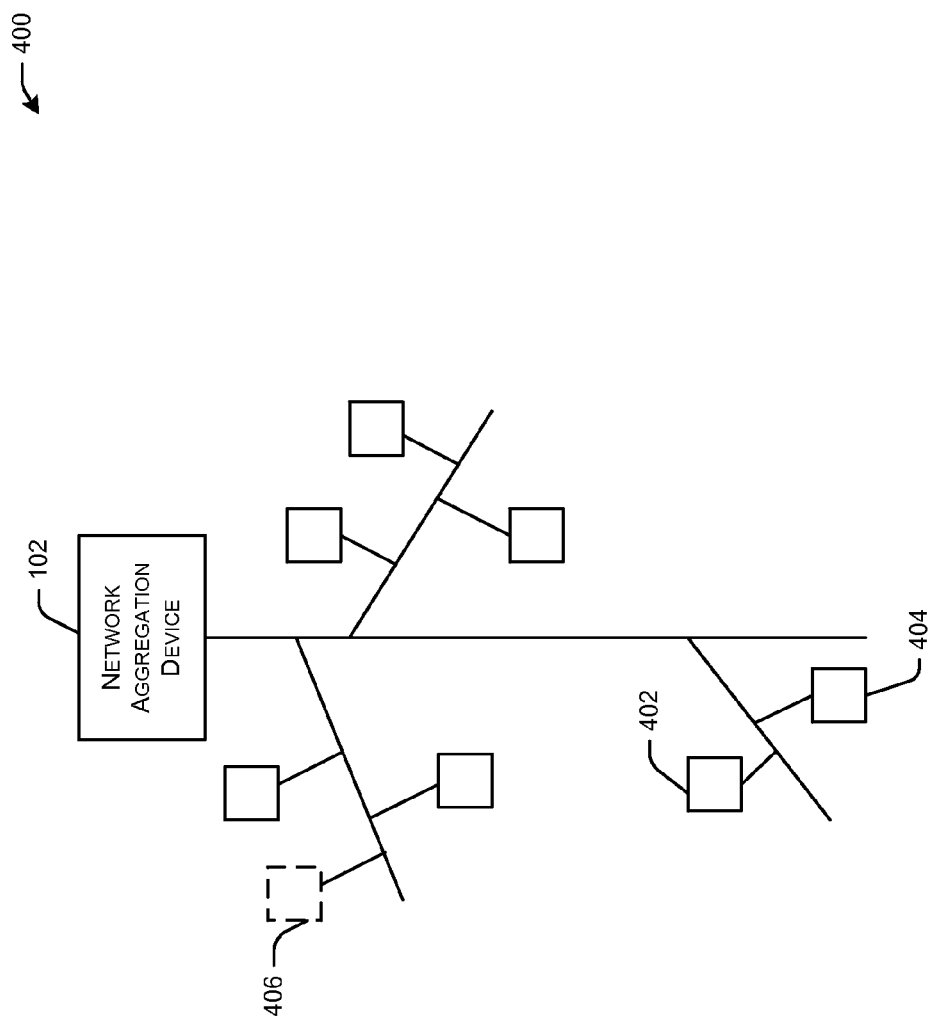
FIG. 4 is a schematic depiction of an illustrative network taxonomy that indicates a network anomaly in accordance with one or more example embodiments of the disclosure.

FIG. 4 is a schematic depiction of an illustrative network taxonomy 400 that indicates a network anomaly in accordance with one or more example embodiments of the disclosure. As previously described, a network access device 404 may be determined to have a particular location in the network taxonomy 400 based at least in part on timing data. In certain example embodiments, performance data may be used in conjunction with (or in lieu of) timing data to determine the location of network access device 404 in the network taxonomy 400 in relation to the location of another network access device 402 in the network taxonomy 400. A determined location of the network access device 404 within the network taxonomy 400 may be compared to stored data indicating a service address associated with the network access device 404. If the location of the network access device 404 within the network taxonomy indicates that the device is not located at the associated service address, this may indicate a possibility of theft or misuse of the device. For example, the designated service address for the network access device 404 may indicate that the device 404 should occupy location 406 in the network taxonomy 400. However, an evaluation of timing data, performance data, and/or other data may indicate that the device 404 actually occupies a different location within the network taxonomy 400. In such an example embodiment, an alert may be generated to indicate the possibility of device theft or misuse.

Similarly, if performance data associated with network transmissions received from the network access device 404 differs substantially from historical performance data received for the network access device 404, this may also indicate a possibility of theft or misuse of the device 404. In other example embodiments, the timing data, performance data, and/or network taxonomy 400 generally may be evaluated to identify network impairment issues. For example, aberrant performance data may indicate malfunction of a particular network access device (e.g., network access device 404) if performance data for other network access devices (e.g., network access device 402) located proximate to the particular network access device in the network taxonomy do not exhibit similar aberrant performance data. As yet another example, aberrant performance data associated with a group of network access devices that are located similar distances from the network aggregation device 102 may indicate a network issue with another network component (e.g., a TAP to which the group of network access devices are connected).

Illustrative Processes

Figure 5:
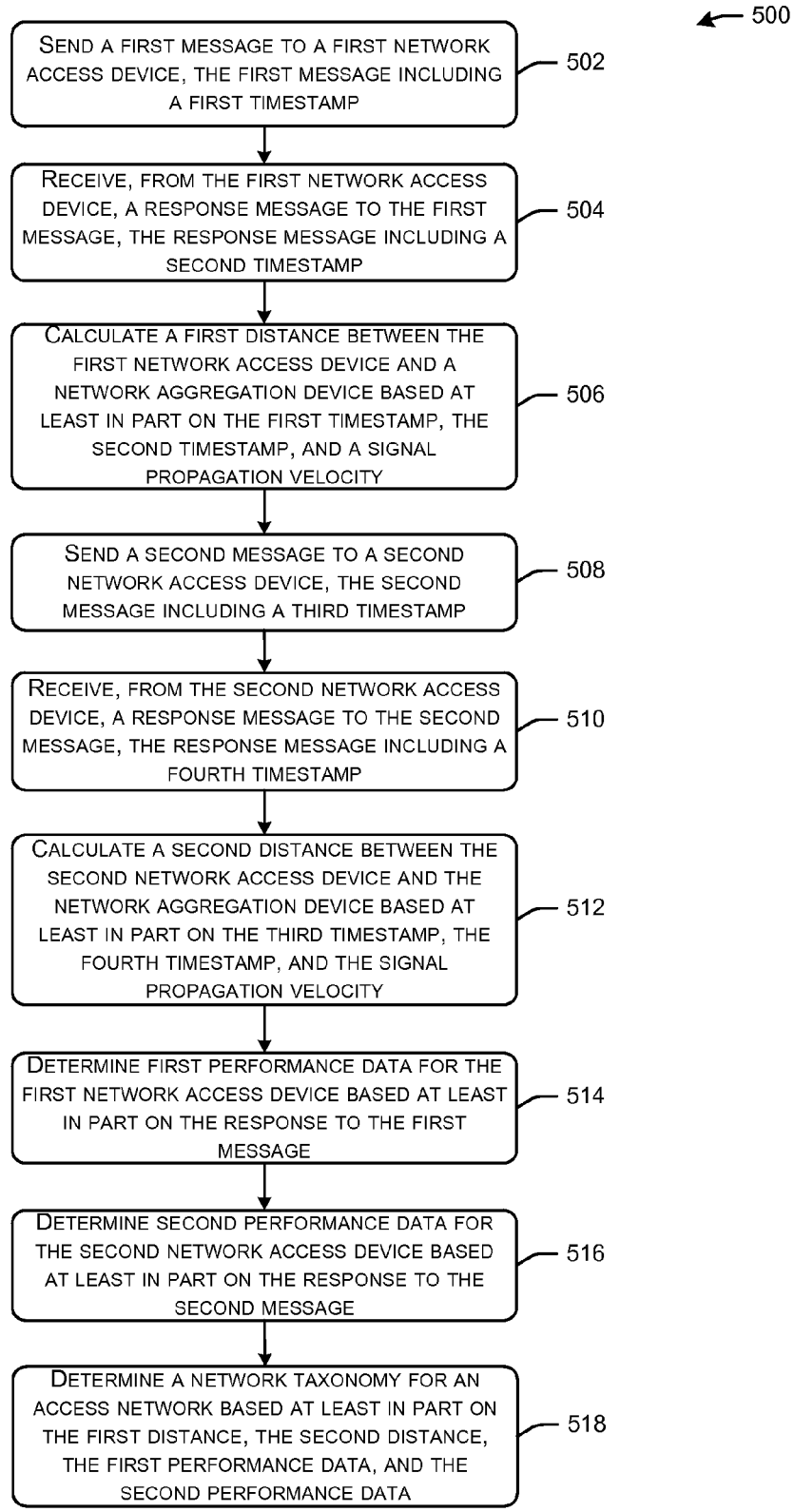
FIG. 5 is a process flow diagram of an illustrative method for determining a network taxonomy in accordance with one or more example embodiments of the disclosure.

FIG. 5 is a process flow diagram of an illustrative method 500 for determining a network taxonomy in accordance with one or more example embodiments of the disclosure. While example operations of the method 500 may be described herein as being performed by the network aggregation device 102, it should be appreciated that any operation of the method 500 may be performed, at least in part, by any other device or device component of the architecture 100.

At block 502, the network aggregation device 102 may send a first message to a first network access device (e.g., network access device 112(1)). The first message may include timing data. For example, the first message may include a header that includes a first timestamp indicating a time of transmission of the first message.

At block 504, the network aggregation device 102 may receive, from the first network access device 112(1), a response message to the first message. The response message may be transmitted by the first network access device 112(1) based at least in part on a messaging protocol associated with the access network 114. The response message may include a header that may include a second timestamp indicating a time of receipt of the first message and/or a time of transmission of the response message.

At block 506, the network aggregation device 102 may calculate a first distance between the first network access device 112(1) and the network aggregation device 102 based at least in part on the first timestamp, the second timestamp, and a signal propagation velocity of signals transmitted across the access network 114. More specifically, the network aggregation device 102 may determine a first elapsed time by calculating a difference between the second timestamp and the first timestamp. The network aggregation device 102 may then determine a second elapsed time by calculating a difference between a time of receipt of the response message and the second timestamp. The network aggregation device 102 may sum the first elapsed time and the second elapsed time to obtain a total round-trip travel time associated with the first message and the response message. The network aggregation device 102 may then multiply the round-trip travel time by the signal propagation velocity to determine the first distance between the first network access device 112(1) and the network aggregation device 102.

At blocks 508-512, the network aggregation device 102 may perform similar operations with respect to a second network access device (e.g., network access device 112(2)) to determine a second distance between the network aggregation device 102 and the second network access device 112(2). More specifically, at block 508, the network aggregation device 102 may send a second message to the second network access device 112(2). The second message may include timing data. For example, the second message may include a header that includes a third timestamp indicating a time of transmission of the second message.

At block 510, the network aggregation device 102 may receive, from the second network access device 112(2), a response message to the second message. The response message may be transmitted by the second network access device 112(2) based at least in part on a messaging protocol associated with the access network 114. The response message may include a header that may include a fourth timestamp indicating a time of receipt of the second message and/or a time of transmission of the corresponding response message.

At block 512, the network aggregation device 102 may calculate a second distance between the second network access device 112(2) and the network aggregation device 102 based at least in part on the third timestamp, the fourth timestamp, and the signal propagation velocity of signals transmitted across the access network 114. More specifically, the network aggregation device 102 may determine a third elapsed time by calculating a difference between the fourth timestamp and the third timestamp. The network aggregation device 102 may then determine a fourth elapsed time by calculating a difference between a time of receipt of the response message to the second message and the fourth timestamp. The network aggregation device 102 may sum the third elapsed time and the fourth elapsed time to obtain a total round-trip travel time associated with the second message and the corresponding response message. The network aggregation device 102 may then multiply this round-trip travel time by the signal propagation velocity to determine the second distance between the second network access device 112(2) and the network aggregation device 102.

At block 514, the network aggregation device 102 may determine first performance data for the first network access device 112(1) based at least in part on the response message corresponding to the first message. Similarly, at block 516, the network aggregation device 102 may determine second performance data for the second network access device 112(2) based at least in part on the response message corresponding to the second message. The first performance data and the second performance data may each include equalization coefficient data, linear distortion data, or the like for the first network access device 112(1) and the second network access device 112(2), respectively.

At block 518, the network aggregation device 102 may determine a network taxonomy for the access network 114 based at least in part on the first distance, the second distance, the first performance data, and the second performance data. For example, in certain example embodiments, the first performance data and the second performance data may be compared to determine the relative locations of the first network access device 112(1) and the second network access device 112(2) in the access network 114 with respect to one another and with respect to the network aggregation device 102. In certain example embodiments, the location of the first network access device 112(1) in the network taxonomy may be determined using the first distance and results of comparing the first performance data to the second performance data and/or to the performance data associated with one or more other network access devices.

More specifically, the first performance data may include a first value of a network performance parameter. For example, the first performance data may include a first set of one or more equalization coefficients associated with network transmissions to/from the first network access device 112(1). The second performance data may include a second set of one or more equalization coefficients associated with network transmissions to/from the second network access device 112(2). If the first set of equalization coefficients is within a threshold value of a second set of equalization coefficients, and if the first distance and the second distance are approximately the same, it may be determined that the first network access device 112(1) and the second network access device 112(2) are associated with a same network segment of the network taxonomy. If the first set of equalization coefficients is not within a threshold value of the second set of equalization coefficients, the first set of equalization coefficients may be compared to equalization coefficient data associated with one or more other network access devices to determine, in conjunction with the first distance and the respective distances of the one or more other network access devices from the network aggregation device 102, which network access devices may be located proximately to the first network access device 112(1) in the access network 114. The location of the second network access device 112(2) in the network taxonomy, as well as the respective location of each other network access device in the access network 114, may be similarly determined. It should be appreciated that other network performance parameters may be used in addition to, or in lieu of, equalization coefficients to determine network access device locations in the network taxonomy.

FIG. 6 is a process flow diagram of an illustrative method 600 for identifying a network anomaly using a network taxonomy in accordance with one or more example embodiments of the disclosure. One or more operations of method 600 may be performed by any device or device component of the architecture 100 (e.g., the network aggregation device 102).

At block 602, a location of a network access device within a network taxonomy may be determined. As previously described, the location of the network access device may be determined based at least in part on timing data and/or performance data received for the network access device. In addition, performance data associated with one or more other network access devices may also be used to determine the location of the network access device in the network taxonomy at block 602.

At block 604, stored data may be retrieved. The stored data may be indicative of an expected location of the network access device in the network taxonomy and/or expected performance data for the network access device. The performance data may be, for example, historical performance data received and/or generated from network transmissions received from the network access device over any period of time.

At block 606, a network anomaly may be determined to exist based at least in part on a comparison of the location determined at block 602 and/or the performance data used to determine the location at block 602 with the stored data. For example, a determined location of the network access device within the network taxonomy may be compared to stored data indicating a service address associated with the network access device. If the determined location of the network access device within the network taxonomy indicates that the device is not located at the associated service address, this may indicate a possibility of theft or misuse of the device. At block 608, an alert indicative of the network anomaly (e.g., a network access device not located at the designated service address) may be generated.

In other example embodiments, if performance data associated with network transmissions received from the network access device differs substantially from historical performance data received for the network access device, this may also indicate a possibility of theft or misuse of the device. In other example embodiments, the timing data, performance data, and/or network taxonomy generally may be evaluated to identify network impairment issues. For example, aberrant performance data may indicate malfunction of a particular network access device if performance data for other network access devices located proximate to the particular network access device in the network taxonomy do not exhibit similar aberrant performance data. As yet another example, aberrant performance data associated with a group of network access devices that are located similar distances from a network aggregation device may indicate a network issue with another network component (e.g., a TAP to which the group of network access devices is connected).

Illustrative Device Architecture

Figure 7:
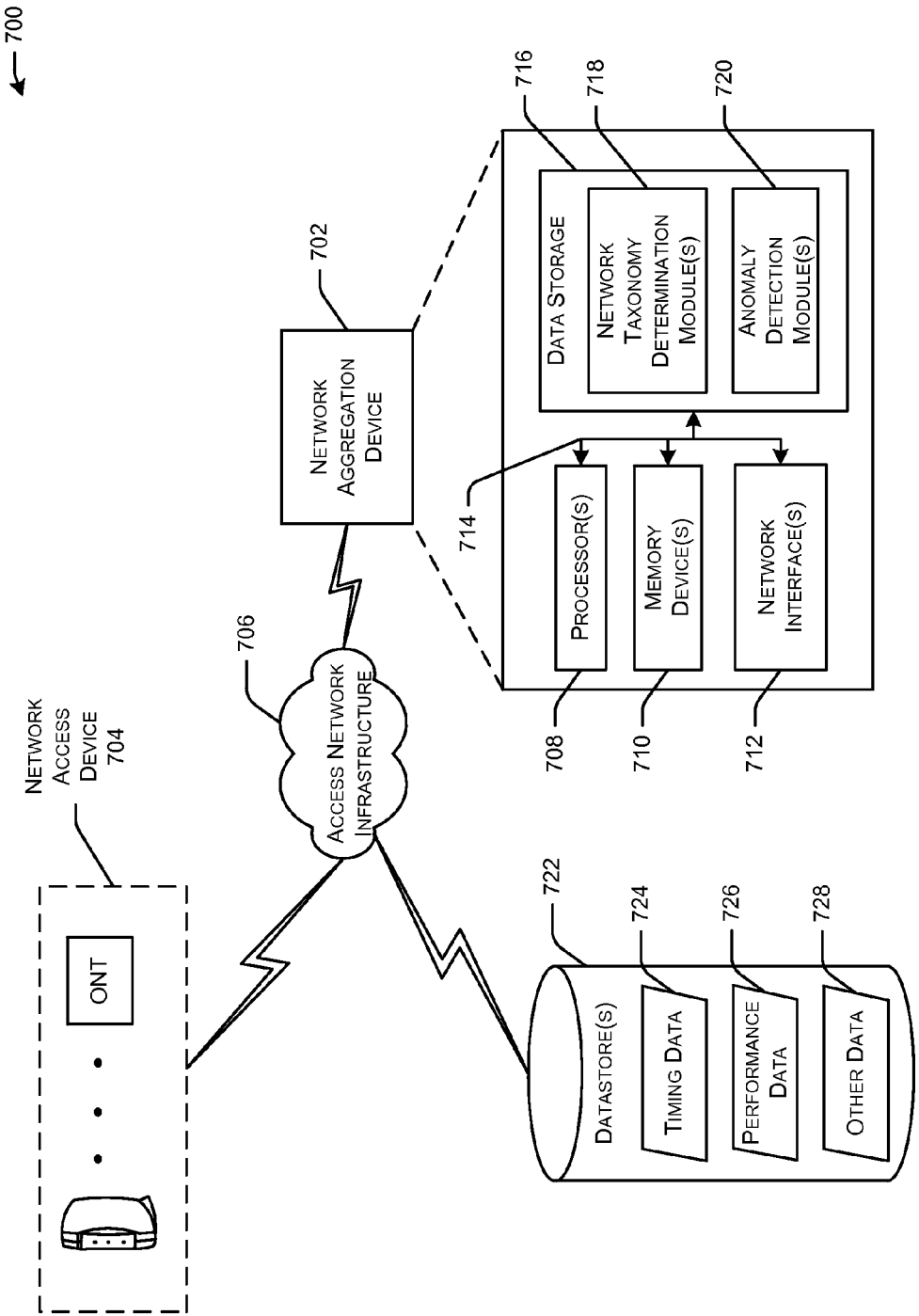
FIG. 7 is a schematic block diagram of an illustrative system architecture in accordance with one or more example embodiments of the disclosure.

FIG. 7 is a schematic block diagram of an illustrative access network architecture 700 in accordance with one or more example embodiments of the disclosure. The architecture 700 may represent at least a portion of the architecture 100 shown in FIG. 1. The architecture 700 may include an access network infrastructure 706 via which one or more network access devices 704 may be communicatively coupled to a network aggregation device 702. The network aggregation device 702 may correspond to the network aggregation device 102. Similarly, the access network infrastructure 706 may correspond to the access network infrastructure 110 and the network access device(s) 704 may correspond to any of the network access devices 112(1)-112(N).

Depending on the type of access network, the network access device(s) 704 may include a cable modem, a DSL modem, an ONT (also known as an ONU), a gateway device, a set-top box, or the like. Further, depending on the type of access network, the network aggregation device 702 may be a CMTS, a Converged Cable Access Platform (CCAP), an OLT, a DSLAM, or the like. The access network infrastructure 706 may be an all-coaxial infrastructure, an HFC infrastructure, an optical distribution network infrastructure, a wireless network infrastructure, or the like. One or more datastores 722 may be accessible by, for example, the network aggregation device 702 via the access network infrastructure 706. In other example embodiments, the datastore(s) 722 may be accessible by the network aggregation device 702 via one or more communication links not forming part of the access network infrastructure 706 (e.g., via the Internet). The datastore(s) 722 may store timing data 724, performance data 726, and/or other data 728. In certain example embodiments, the datastore(s) 722 may correspond to the datastore(s) 302, and similarly, the timing data 724 may correspond to the timing data 304, the performance data 726 may correspond to the performance data 306, and the other data 728 may correspond to the other data 308.

In an illustrative configuration, the network aggregation device 702 may include one or more processors (processor(s)) 708, one or more memory devices 710 (generically referred to herein as memory 710), one or more network interface(s) 712, and data storage 716. These various components will be described in more detail hereinafter.

The memory 710 of the network aggregation device 702 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 710 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 716 may include removable storage and/or non-removable storage including, but not limited to, magnetic storage, optical disk storage, and/or tape storage. The data storage 716 may provide non-transient storage of computer-executable instructions and other data. The data storage 716 may include storage that is internal and/or external to the network aggregation device 702. The memory 710 and the data storage 716, removable and/or non-removable, are examples of computer-readable storage media (CRSM) as that term is used herein.

The data storage 716 may store computer-executable instructions that are loadable into the memory 710 and executable by the processor(s) 708 to cause various operations to be performed. The data storage 716 may additionally store data that may be copied to memory 710 for use by the processor(s) 708 during the execution of the computer-executable instructions. Moreover, output data generated as a result of execution of the computer-executable instructions by the processor(s) 708 may be stored initially in memory 710, and may ultimately be copied to data storage 716 for non-transient storage.

More specifically, the data storage 716 may store one or more program modules, applications, or the like such as, for example, one or more network taxonomy determination modules 718 and one or more anomaly detection modules 720. Although not depicted in FIG. 7, the network aggregation device 702 may further include one or more operating systems (O/S) and one or more database management systems (DBMS). The O/S may be loaded into the memory 710 and may provide an interface between other application software executing on the network aggregation device 702 and hardware resources of network aggregation device 702. More specifically, the O/S may include a set of computer-executable instructions for managing hardware resources of the network aggregation device 702 and for providing common services to other application programs (e.g., managing memory allocation among various application programs). The DBMS may be loaded into the memory 710 and may support functionality for accessing, retrieving, storing, and/or manipulating data stored in the datastore(s) 722, data stored in the memory 710, and/or data stored in the data storage 716. The DBMS may use any of a variety of database models (e.g., relational model, object model, etc.) and may support any of a variety of query languages.

The network taxonomy determination module(s) 718 may include computer-executable instructions, code, or the like that responsive to execution by one or more of the processor(s) 708 may cause any of the operations described herein to be performed to determine a network taxonomy for an access network based at least in part on timing data 724, performance data 726, and/or other data 728. The anomaly detection module(s) 720 may include computer-executable instructions, code, or the like that responsive to execution by one or more of the processor(s) 708 may cause any of the operations described herein to be performed to determine whether a network anomaly exists based at least in part on a network taxonomy for an access network and stored data associated with the performance, location, etc. of network access device(s) 704.

The processor(s) 708 may be configured to access the memory 710 and execute computer-executable instructions stored therein. For example, the processor(s) 708 may be configured to execute computer-executable instructions of the various program modules of the network aggregation device 702 to cause or facilitate various operations to be performed in accordance with one or more embodiments of the disclosure. The processor(s) 708 may include any suitable processing unit capable of accepting digital data as input, processing the input data in accordance with stored computer-executable instructions, and generating output data. The processor(s) 708 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 may be capable of supporting any of a variety of instruction sets.

The network aggregation device 702 may be configured to communicate with any of a variety of other systems, platforms, networks, devices, and so forth via the access network infrastructure 706 and/or via the back-end core network 104 depicted in FIG. 1. The network aggregation device 702 may include one or more network interfaces 712 that may facilitate such communication.

It should be appreciated that the program modules or applications depicted in FIG. 7 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device and/or hosted on remote computing device(s) may be provided to support functionality provided by the program modules depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices of the architecture 700 and/or the architecture 100 in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that any illustrative component of the architecture 700 or the architecture 100 may include alternate and/or additional hardware, software, or firmware components beyond those described or depicted without departing from the scope of the disclosure. More particularly, it should be appreciated that software, firmware, or hardware components depicted as forming part of any component of the architecture 700 or the architecture 100 are merely illustrative and that some components may not be present or additional components may be provided in various embodiments. Furthermore, certain components of the architecture 700 or the architecture 100 may not be present in certain example embodiments, while in certain example embodiments, additional components may be present.

In addition, while various illustrative program modules have been depicted as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the method 500 or the method 600 may have been described as being performed by the network aggregation device 102. It should be appreciated, however, that any of the operations of the method 500 or the method 600 described as being performed by a particular component or a particular program module executing thereon may be performed by another component of the architecture 700 or the architecture 100, or by another program module executing thereon. While the operations of the method 500 or the method 600 may be described in the context of the illustrative architecture 100 or the illustrative architecture 700, it should be appreciated that the methods may be implemented in connection with numerous other architectural and device level configurations.

In addition, it should be appreciated that the operations described and depicted in the illustrative methods of FIGS. 5 and 6 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 5 and 6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, etc.).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   determining, by one or more computer processors, a travel time associated with one or more network transmissions between a network aggregation device and a network access device, wherein the network aggregation device and the network access device are connected via one or more communication links of an access network;
   determining, by the one or more computer processors, a distance between the network aggregation device and the network access device based at least in part on the travel time and a signal propagation velocity associated with the access network; and determining, by the one or more computer processors, a location of the network access device within the access network based at least in part on the distance.

2. The method of claim 1, wherein determining the travel time comprises:
   determining, by the one or more computer processors, a first timestamp included in a first message from the network aggregation device to the network access device, wherein the first timestamp indicates a time of transmission of the first message;
   determining, by the one or more computer processors, a second timestamp included in a second message from the network access device to the network aggregation device in response to the first message, wherein the second timestamp indicates a time of receipt of the first message by the network access device or a time of transmission of the second message;
   determining, by the one or more computer processors, a first elapsed time corresponding to a difference between the first timestamp and the second timestamp;
   determining, by the one or more computer processors, a second elapsed time corresponding to a difference between the second timestamp and time of receipt of the second message by the network aggregation device; and
   determining, by the one or more computer processors, the travel time by summing the first elapsed time and the second elapsed time.

3. The method of claim 1, wherein the network access device is a first network access device, the travel time is a first travel time, the distance is a first distance, and the one or more network transmissions are a first one or more network transmissions, the method further comprising:
   determining, by one or more computer processors, a second travel time associated with a second one or more network transmissions between the network aggregation device and a second network access device;
   determining, by the one or more computer processors, a second distance between the network aggregation device and the second network access device based at least in part on the second travel time and the signal propagation velocity associated with the access network;
   determining, by the one or more computer processors, first performance data associated with the first one or more network transmissions;
   determining, by the one or more computer processors, second performance data associated with the second one or more network transmissions;
   determining, by the one or more computer processors, the location of the first network access device based at least in part on the first distance, the first performance data, and the second performance data; and
   determining, by the one or more computer processors, a second location of the second network access device based at least in part on the second distance, the first performance data, and the second performance data.

4. The method of claim 3, wherein the first performance data comprises a first value of a network performance parameter and the second performance data comprises a second value of the network performance parameter, the method further comprising:
   determining, by the one or more computer processors, that a difference between the first value and the second value is less than a first threshold value; and
   determining, by the one or more computer processors, that a difference between the first distance and the second distance is less than a second threshold value;
   wherein determining the location of the first network access device and the second location of the second network access device comprises determining that the location and the second location are associated with a same network segment of the access network.

5. The method of claim 3, wherein the first performance data comprises a first value of a network performance parameter and the second performance data comprises a second value of the network performance parameter, the method further comprising:
   determining, by the one or more computer processors, that a difference between the first value and the second value exceeds a threshold value,
   wherein determining the location of the first network access device and the second location of the second network access device comprises determining that the location and the second location are associated with different network segments of the access network.

6. The method of claim 5, wherein the network performance parameter comprises an equalization coefficient or a linear signal distortion.

7. The method of claim 1, further comprising:
   determining, by the one or more computer processors, a designated location associated with the network access device;
   determining, by the one or more computer processors, that the location of the network access device in the access network is different from the designated location; and
   generating, by the one or more computer processors, an alert indicating possible theft of the network access device.

8. A network aggregation device, comprising:
   at least one memory storing computer-executable instructions; and
   at least one processor configured to access the at least one memory and execute the computer-executable instructions to:
      determine a travel time associated with one or more network transmissions between the network aggregation device and a network access device, wherein the network aggregation device and the network access device are connected via one or more communication links of an access network;
      determine a distance between the network aggregation device and the network access device based at least in part on the travel time and a signal propagation velocity associated with the access network; and
      determine a location of the network access device within the access network based at least in part on the distance.

9. The device of claim 8, wherein the at least one processor is configured to determine the travel time by executing the computer-executable instructions to:
   determine a first timestamp included in a first message from the network aggregation device to the network access device, wherein the first timestamp indicates a time of transmission of the first message;
   determine a second timestamp included in a second message from the network access device to the network aggregation device in response to the first message, wherein the second timestamp indicates a time of receipt of the first message by the network access device or a time of transmission of the second message;

determine a first elapsed time corresponding to a difference between the first timestamp and the second timestamp;

determine a second elapsed time corresponding to a difference between the second timestamp and time of receipt of the second message by the network aggregation device; and determine the travel time by summing the first elapsed time and the second elapsed time.

10. The device of claim 8, wherein the network access device is a first network access device, the travel time is a first travel time, the distance is a first distance, and the one or more network transmissions are a first one or more network transmissions, and wherein the at least one processor is further configured to execute the computer-executable instructions to:

determine a second travel time associated with a second one or more network transmissions between the network aggregation device and a second network access device;

determine a second distance between the network aggregation device and the second network access device based at least in part on the second travel time and the signal propagation velocity associated with the access network;

determine first performance data associated with the first one or more network transmissions;

determine second performance data associated with the second one or more network transmissions;

determine the location of the first network access device based at least in part on the first distance, the first performance data, and the second performance data; and determine a second location of the second network access device based at least in part on the second distance, the first performance data, and the second performance data.

11. The device of claim 10, wherein the first performance data comprises a first value of a network performance parameter and the second performance data comprises a second value of the network performance parameter, and wherein the at least one processor is further configured to execute the computer-executable instructions to:

determine that a difference between the first value and the second value is less than a first threshold value; and determine that a difference between the first distance and the second distance is less than a second threshold value;

wherein determining the location of the first network access device and the second location of the second network access device comprises determining that the location and the second location are associated with a same network segment of the access network.

12. The device of claim 10, wherein the first performance data comprises a first value of a network performance parameter and the second performance data comprises a second value of the network performance parameter, and wherein the at least one processor is further configured to execute the computer-executable instructions to:

determine that a difference between the first value and the second value exceeds a threshold value, wherein determining the location of the first network access device and the second location of the second network access device comprises determining that the location and the second location are associated with different network segments of the access network.

13. The device of claim 8, wherein the at least one processor is further configured to execute the computer-executable instructions to:

determine a designated location associated with the network access device;

determine that the location of the network access device in the access network is different from the designated location; and generate an alert indicating possible theft of the network access device.

14. One or more non-transitory computer-readable media storing computer-executable instructions that, responsive to execute by at least one computer processor, configure the at least one computer processor to perform operations comprising:

determining a travel time associated with one or more network transmissions between a network aggregation device and a network access device, wherein the network aggregation device and the network access device are connected via one or more communication links of an access network;

determining a distance between the network aggregation device and the network access device based at least in part on the travel time and a signal propagation velocity associated with the access network; and determining a location of the network access device within the access network based at least in part on the distance.

15. The one or more computer-readable media of claim 14, wherein determining the travel time comprises:

determining a first timestamp included in a first message from the network aggregation device to the network access device, wherein the first timestamp indicates a time of transmission of the first message;

determining a second timestamp included in a second message from the network access device to the network aggregation device in response to the first message, wherein the second timestamp indicates a time of receipt of the first message by the network access device or a time of transmission of the second message;

determining a first elapsed time corresponding to a difference between the first timestamp and the second timestamp;

determining a second elapsed time corresponding to a difference between the second timestamp and time of receipt of the second message by the network aggregation device; and determining the travel time by summing the first elapsed time and the second elapsed time.

16. The one or more computer-readable media of claim 14, wherein the network access device is a first network access device, the travel time is a first travel time, the distance is a first distance, and the one or more network transmissions are a first one or more network transmissions, the operations further comprising:

determining a second travel time associated with a second one or more network transmissions between the network aggregation device and a second network access device;

determining a second distance between the network aggregation device and the second network access device based at least in part on the second travel time and the signal propagation velocity associated with the access network;

determining first performance data associated with the first one or more network transmissions;

determining second performance data associated with the second one or more network transmissions;

determining the location of the first network access device based at least in part on the first distance, the first performance data, and the second performance data; and determining a second location of the second network access device based at least in part on the second distance, the first performance data, and the second performance data.

17. The one or more computer-readable media of claim 16, wherein the first performance data comprises a first value of a network performance parameter and the second performance data comprises a second value of the network performance parameter, the operations further comprising:

determining that a difference between the first value and the second value is less than a first threshold value; and determining that a difference between the first distance and the second distance is less than a second threshold value;

wherein determining the location of the first network access device and the second location of the second network access device comprises determining that the location and the second location are associated with a same network segment of the access network.

18. The one or more computer-readable media of claim 16, wherein the first performance data comprises a first value of a network performance parameter and the second performance data comprises a second value of the network performance parameter, the operations further comprising:

determining that a difference between the first value and the second value exceeds a threshold value, wherein determining the location of the first network access device and the second location of the second network access device comprises determining that the first location and the second location are associated with different network segments of the access network.

19. The one or more computer-readable media of claim 18, wherein the network performance parameter comprises an equalization coefficient or a linear signal distortion.

20. The one or more computer-readable media of claim 14, the operations further comprising:

determining a designated location associated with the network access device;

determining that the location of the network access device in the access network is different from the designated location; and generating an alert indicating possible theft of the network access device.

* * * * *